US008034731B2

(12) United States Patent
Koike et al.

(10) Patent No.: US 8,034,731 B2
(45) Date of Patent: Oct. 11, 2011

(54) TIO$_2$-CONTAINING SILICA GLASS AND OPTICAL MEMBER FOR LITHOGRAPHY USING THE SAME

(75) Inventors: Akio Koike, Tokyo (JP); Yasutomi Iwahashi, Tokyo (JP); Shinya Kikugawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/862,174

(22) Filed: Aug. 24, 2010

(65) Prior Publication Data
US 2010/0317505 A1    Dec. 16, 2010

Related U.S. Application Data

(63) Continuation of application No. PCT/JP2009/053995, filed on Feb. 25, 2009.

(30) Foreign Application Priority Data

Feb. 25, 2008    (JP) .................................. 2008-043583

(51) Int. Cl.
*C03C 3/06*      (2006.01)
*C03C 3/076*     (2006.01)
*C03B 19/06*     (2006.01)
*C03B 25/00*     (2006.01)

(52) U.S. Cl. ................. 501/54; 501/55; 65/17.4; 65/117

(58) Field of Classification Search .................... 501/53, 501/54, 55; 65/17.4, 117, 391
See application file for complete search history.

(56) References Cited

U.S. PATENT DOCUMENTS

| | | | |
|---|---|---|---|
| 7,294,595 B2 | 11/2007 | Iwahashi et al. | |
| 7,410,922 B2 | 8/2008 | Iwahashi et al. | |
| 7,419,924 B2 | 9/2008 | Koike et al. | |
| 7,429,546 B2 | 9/2008 | Iwahashi et al. | |
| 7,462,574 B2 | 12/2008 | Iwahashi et al. | |
| 7,485,593 B2 | 2/2009 | Ezaki et al. | |
| 7,538,052 B2 | 5/2009 | Iwahashi et al. | |
| 2002/0157421 A1 | 10/2002 | Ackerman et al. | |
| 2005/0272590 A1* | 12/2005 | Iwahashi et al. | 501/55 |
| 2006/0179879 A1* | 8/2006 | Ellison et al. | 65/17.4 |

(Continued)

FOREIGN PATENT DOCUMENTS

| | | |
|---|---|---|
| JP | 2005-104820 | 4/2005 |
| WO | 2004/089839 | 10/2004 |

OTHER PUBLICATIONS

U.S. Appl. No. 12/870,156, filed Aug. 27, 2010, Koike et al.

(Continued)

*Primary Examiner* — Jerry A Lorengo
*Assistant Examiner* — Noah Wiese
(74) *Attorney, Agent, or Firm* — Oblon, Spivak, McClelland, Maier & Neustadt, L.L.P.

(57) ABSTRACT

The present invention is to provide a TiO$_2$—SiO$_2$ glass whose coefficient of linear thermal expansion at the time of irradiating with high EUV energy light becomes substantially zero when used as an optical member of an exposure tool for EUVL. The present invention relates to a TiO$_2$-containing silica glass, having a fictive temperature of 1,000° C. or lower, a OH concentration of 600 ppm or higher, a temperature at which the coefficient of linear thermal expansion becomes 0 ppb/° C. of from 40 to 110° C., and an average coefficient of linear thermal expansion in the temperature range of 20 to 100° C., of 50 ppb/° C. or lower.

10 Claims, 1 Drawing Sheet

U.S. PATENT DOCUMENTS

2006/0276323 A1* 12/2006 Iwahashi et al. ............ 501/54
2008/0004169 A1* 1/2008 Ellison ...................... 501/54
2008/0274869 A1* 11/2008 Englisch et al. ............ 501/54
2009/0122281 A1 5/2009 Iwahashi et al.
2010/0261597 A1 10/2010 Koike et al.

OTHER PUBLICATIONS

U.S. Appl. No. 12/869,035, filed Aug. 26, 2010, Koike et al.
U.S. Appl. No. 12/868,900, filed Aug. 26, 2010, Koike et al.

* cited by examiner

TIO$_2$-CONTAINING SILICA GLASS AND OPTICAL MEMBER FOR LITHOGRAPHY USING THE SAME

TECHNICAL FIELD

The present invention relates to a TiO$_2$-containing silica glass (hereinafter, in the context of the present invention, referred to as a TiO$_2$—SiO$_2$ glass). More specifically, the present invention relates to a TiO$_2$—SiO$_2$ glass that is used as an optical member of an exposure tool for EUV lithography. Incidentally, EUV (extreme ultraviolet) light as used in the present invention indicates light with a wavelength band in a soft X-ray region or a vacuum ultraviolet region, and this is specifically light at a wavelength of approximately from 0.2 to 100 nm.

BACKGROUND ART

In the photolithography technology, an exposure tool for manufacturing an integrated circuit by transferring a fine circuit pattern onto a wafer has hitherto been widely utilized. With the trend toward a higher degree of integration and a higher function of an integrated circuit, the refinement of the integrated circuit is advancing. The exposure tool is hence required to form a circuit pattern image with high resolution on a wafer surface at a long focal depth, and shortening of the wavelength of an exposure light source is being advanced. The exposure light source is further advancing from conventional g-line (wavelength: 436 nm), i-line (wavelength: 365 nm) and a KrF excimer laser (wavelength: 248 nm), and an ArF excimer laser (wavelength: 193 nm) is coming to be employed. Also, in order to cope with a next-generation integrated circuit whose circuit line width will become not more than 70 nm, an immersion lithography technique and a double exposure technique, each using an ArF excimer laser, are regarded as being leading. However, it is considered that even these techniques would be able to cover only the generation with a line width of up to 45 nm.

Under the foregoing technical trends, a lithography technique using, as an exposure light source, light having a wavelength of 13 nm to represent EUV light (extreme ultraviolet light) is considered to be applicable over generation of 32 nm and thereafter, and is attracting attention. The principle of image formation of the EUV lithography (hereinafter referred to as "EUVL") is identical with that of the conventional lithography from the viewpoint that a mask pattern is transferred using a projection optical system. However, since there is no material capable of transmitting light therethrough in the EUV light energy region, a refractive optical system cannot be used. Accordingly, the optical systems are all reflecting optical systems.

The optical member of an exposure tool for EUVL includes a photomask and a mirror, and is basically configured of (1) a substrate, (2) a reflective multilayer formed on the substrate and (3) an absorber layer formed on the reflective multilayer. For the reflective multilayer, an Mo/Si reflective multilayer in which an Mo layer and an Si layer are alternately laminated is investigated; and for the absorber layer, Ta and Cr are investigated. For the substrate, a material having a low coefficient of thermal expansion is required so as not to generate a strain even under irradiation with EUV light, and a glass having a low coefficient of thermal expansion or the like is investigated.

The TiO$_2$—SiO$_2$ glass is known as an extremely low thermal expansion material having a coefficient of thermal expansion (CTE) lower than that of a silica glass. Also, since the coefficient of thermal expansion can be controlled by the TiO$_2$ content in glass, a zero-expansion glass whose coefficient of linear thermal expansion is close to 0 can be obtained. Accordingly, the TiO$_2$—SiO$_2$ glass involves a possibility as a material to be used in an optical member of an exposure tool for EUVL.

According to the conventional preparation method of a TiO$_2$—SiO$_2$ glass, first of all, a silica precursor and a titania precursor are each converted into a gas phase and then mixed with each other. The mixture in a gas phase is introduced into a burner and thermally decomposed, thereby forming a TiO$_2$—SiO$_2$ glass particle. This TiO$_2$—SiO$_2$ glass particle is deposited in a refractory container and melted therein simultaneously with the deposition, thereby forming a TiO$_2$—SiO$_2$ glass.

Also, Patent Document 1 discloses a method in which a TiO$_2$—SiO$_2$ porous glass body is formed and converted it into a glass body, and a mask substrate is then obtained.

The optical member of an exposure tool for EUVL is irradiated with high-energy EUV light during use in the exposure tool for EUVL, and the temperature of the member locally rises. Accordingly, the optical member of an exposure tool for EUVL preferably has a wide temperature region allowing the coefficient of thermal expansion to become substantially zero, and in Patent Document 2, the present inventors disclose a TiO$_2$—SiO$_2$ glass having a fictive temperature of 1,200° C. or lower and an F concentration of 100 ppm or higher, where the coefficient of thermal expansion in the temperature range of 0 to 100° C. is 0±200 ppb/° C., and a production method of this TiO$_2$—SiO$_2$ glass.

The TiO$_2$—SiO$_2$ glass is considered to be very suitable as a material for the member constituting an optical system used for EUVL, because of a small temperature-dependent change of the coefficient of thermal expansion, that is, a wide temperature range allowing the coefficient of thermal expansion to become substantially zero, and excellent homogeneity in terms of the coefficient of thermal expansion in glass and the mechanical properties.

Patent Document 1: US-A-2002-157421
Patent Document 2: JP-A-2005-104820

DISCLOSURE OF THE INVENTION

For achieving a high throughput of the exposure tool for EUVL, it is effective to raise the energy of EUV light used for exposure. In this case, the temperature of the member is likely to rise over the conventionally expected temperature. Specifically, the temperature of the member is likely to rise to a temperature range of 40 to 110° C. and therefore, the member preferably becomes substantially zero expansion at the above-mentioned temperature so as to prevent a change in the pattern pitch in the case of a photomask or the like and prevent a change in the shape in the case of a stepper mirror or the like.

Also, if a large dimensional change occurs due to a temperature rise from room temperature to a temperature at which the member is used in an exposure tool for EUVL, the pitch or shape of the above-mentioned pattern changes from the state at room temperature, and this is considered to make the optical design of the optical member complicated. Accordingly, the optical member for an exposure tool where high EUV energy light is used for the purpose of raising the throughput preferably is a small in the average coefficient of linear thermal expansion in the range from room temperature to a temperature range of 40 to 110° C.

In the above-described conventional techniques, the temperature range allowing the coefficient of linear thermal expansion to become substantially zero is wide, but the temperature for zero expansion is room temperature and therefore, the coefficient of linear thermal expansion may not become zero in a temperature range of 40 to 110° C., leaving the possibility of causing a non-negligible change in dimension or shape. Also, the average coefficient of linear thermal expansion in the range from room temperature to a temperature of 40 to 110° C. is large and this may impose a problem that the optical design of the optical member becomes complicated.

In order to solve the foregoing problems in the conventional techniques, an object of the present invention is to provide a $TiO_2$—$SiO_2$ glass having thermal expansion properties suitable as an optical member for an exposure tool where high EUV energy light is used for the purpose of raising the throughput. More specifically, an object of the present invention is to provide a $TiO_2$—$SiO_2$ glass whose coefficient of linear thermal expansion at the time of irradiating with high EUV energy light becomes substantially zero when used as an optical member of an exposure tool for EUVL.

The present invention provides a $TiO_2$-containing silica glass, having a fictive temperature of 1,000° C. or lower, a OH concentration of 600 ppm or higher, a temperature at which the coefficient of linear thermal expansion becomes 0 ppb/° C. of from 40 to 110° C., and an average coefficient of linear thermal expansion in the temperature range of 20 to 100° C., of 50 ppb/° C. or lower (hereinafter referred to as the "$TiO_2$—$SiO_2$ glass of the present invention").

The $TiO_2$—$SiO_2$ glass of the present invention is extremely suitable as an optical member of an exposure tool for EUVL, because the average coefficient of linear thermal expansion is very small even where the temperature rises from room temperature to high temperature at the irradiation of high EUV energy light and at the same time, the coefficient of linear thermal expansion at the irradiation of high EUV energy light becomes substantially zero.

BEST MODE FOR CARRYING OUT THE INVENTION

Figure 1:
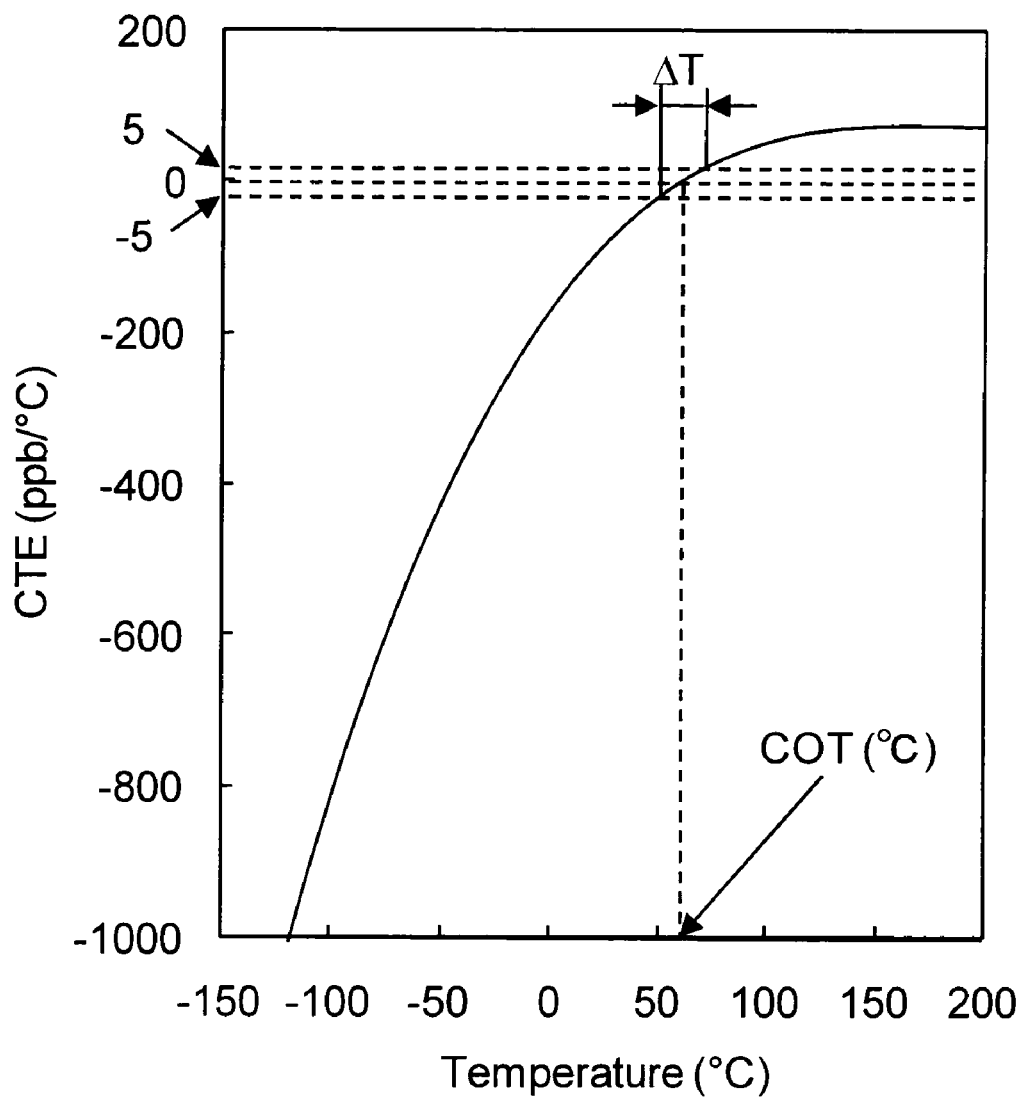
FIG. 1 is a graph plotting the relationship between CTE and temperature.

The $TiO_2$—$SiO_2$ glass of the present invention is hereunder described with reference to the accompanying drawings.

The $TiO_2$—$SiO_2$ glass of the present invention has a temperature, at which the coefficient of linear thermal expansion (hereinafter referred to as CTE) becomes 0 ppb/° C. (crossover temperature; hereinafter referred to as COT), falling within the range of from 40 to 110° C. and the average coefficient of linear thermal expansion in the temperature range of 20 to 100° C. is 50 ppb/° C. or lower.

In the $TiO_2$—$SiO_2$ glass of the present invention, the $TiO_2$ content is preferably from 7.5 to 12% by mass.

In the $TiO_2$—$SiO_2$ glass of the present invention, the temperature width in which the coefficient of linear thermal expansion (CTE) becomes 0±5 ppb/° C. (hereinafter referred to as ΔT) is preferably 5° C. or greater.

In the $TiO_2$—$SiO_2$ glass of the present invention, the average coefficient of linear thermal expansion in the temperature range of 20 to 100° C. is preferably −120 ppb/° C. or higher.

The $TiO_2$—$SiO_2$ glass of the present invention is preferably free of an inclusion.

The COT, the average coefficient of linear thermal expansion in the temperature range of 20 to 100° C., and the ΔT of the $TiO_2$—$SiO_2$ glass can be determined by measuring the coefficient of linear thermal expansion (CTE) of the $TiO_2$—$SiO_2$ glass in the temperature range of −150 to +200° C. by a known method, for example, by using a laser interferometric dilatometer and plotting the relationship between CTE and temperature as illustrated in FIG. 1.

In carrying out EUVL, from the standpoint of preventing changes in dimension and shape of an optical member such as a mirror relative to the temperature, it is preferable that the COT of the optical member to be placed inside of an exposure tool where high EUV energy light is used, falls within the range of from 40 to 110° C. Also, the range where the coefficient of linear thermal expansion becomes 0±5 ppb/° C., that is, the coefficient of linear thermal expansion becomes substantially zero, is preferably wide. Specifically, the temperature at which the coefficient of linear thermal expansion becomes 0±5 ppb/° C. is preferably 5° C. or greater. The temperature of an optical member is suggested to locally rise particularly in the case of a member close to the light source, because high-energy EUV light is irradiated. Although depending on the irradiation conditions of EUV light, the temperature of an optical member is presumed to rise to 40 to 110° C., and a temperature difference of approximately from 4 to 6° C. is locally occurred in some cases.

In the $TiO_2$—$SiO_2$ glass of the present invention, the COT falls within the range of from 40 to 110° C., preferably from 45 to 100° C., more preferably from 50 to 80° C.

In the $TiO_2$—$SiO_2$ glass of the present invention, the average coefficient of linear thermal expansion in the temperature range of 20 to 100° C. is 50 ppb/° C. or lower, whereby upon irradiation with high-energy EUV light, the changes in dimension and shape can be reduced even when the temperature of the optical member rises from room temperature to high temperature. The average coefficient of linear thermal expansion above is preferably 40 ppb/° C. or lower, more preferably 30 ppb/° C. or lower. On the other hand, when the COT is a high temperature, the average coefficient of linear thermal expansion in the temperature range of 20 to 100° C. tends to become a negative value, but from the same reasons, the absolute value of the average coefficient of linear thermal expansion in the temperature range of 20 to 100° C. is preferably small, and the average coefficient of linear thermal expansion in the temperature range of 20 to 100° C. is preferably −120 ppb/° C. or higher, more preferably −100 ppb/° C. or higher, especially preferably −60 ppb/° C. or higher. In the case of more reducing the dimensional or shape change when irradiated with high-energy EUV light, the average coefficient of linear thermal expansion in the temperature range of 20 to 100° C. is preferably −50 ppb/° C. or higher, more preferably −40 ppb/° C. or higher, especially preferably −30 ppb/° C. or higher.

The present inventors have found that when the $TiO_2$ concentration is increased and the fictive temperature is decreased, the COT and the average coefficient of linear thermal expansion in the temperature range of 20 to 100° C. can satisfy the above-described conditions. The reasons thereof are as follows. Owing to the increase in the $TiO_2$ concentration, the COT shifts to the high temperature side and the average coefficient of linear thermal expansion in the temperature range of 20 to 100° C. becomes small. Furthermore, owing to the decrease in the fictive temperature, the average coefficient of linear thermal expansion in the temperature range of 20 to 100° C. can be made further small.

The $TiO_2$—$SiO_2$ glass of the present invention contains OH in addition to $TiO_2$ and $SiO_2$. In the $TiO_2$—$SiO_2$ glass of the present invention, though the remainder exclusive of $TiO_2$ and OH is $SiO_2$, other components than $TiO_2$, $SiO_2$ and OH may be contained.

The $TiO_2$—$SiO_2$ glass is known to change in the coefficient of thermal expansion depending on the concentration of $TiO_2$ contained (see, for example, P. C. Schultz and H. T. Smyth, in: R. W. Douglas and B. Ellis, Amorphous Materials, Willey, N.Y., page 453 (1972)).

Accordingly, the COT of the $TiO_2$—$SiO_2$ glass can be controlled by controlling the $TiO_2$ content of the $TiO_2$—$SiO_2$ glass.

In the $TiO_2$—$SiO_2$ glass of the present invention, the $TiO_2$ content is preferably from 7.5 to 12% by mass. If the $TiO_2$ content is within the above range, the COT tends to fall in the range of 40 to 110° C.

Specifically, if the $TiO_2$ content is less than 7.5% by mass, the COT tends to be lower than 40° C., and if the $TiO_2$ content exceeds 12% by mass, the COT tends to exceed 110° C. or negative expansion tends to occur in the range of −150 to 200° C. Also, a rutile or the like crystal may readily precipitate or a bubble is likely to remain. The $TiO_2$ content is preferably 11% by mass or less, more preferably 10% by mass or less, and the $TiO_2$ content is preferably 8.0% by mass or more, more preferably 8.5% by mass or more.

The present inventors have also found that when the $TiO_2$ concentration is increased and the fictive temperature is decreased, the average coefficient of linear thermal expansion in the temperature range of 20 to 100° C. becomes small.

In the $TiO_2$—$SiO_2$ glass of the present invention, the $TiO_2$ content is from 7.5 to 12% by mass and the fictive temperature is 1,000° C. or lower, whereby the average coefficient of linear thermal expansion in the temperature range of 20 to 100° C. can be 50 ppb/° C. If the fictive temperature exceeds 1,000° C., the average coefficient of linear thermal expansion in the temperature range of 20 to 100° C. exceeds 50 ppb/° C. and when the $TiO_2$—$SiO_2$ glass is used as an optical member of an exposure tool for EUVL, there may arise a problem in the thermal expansion due to change in the temperature of the optical member during EUV light irradiation. The fictive temperature is preferably 950° C. or lower, more preferably 900° C. or lower. In order to make smaller the average coefficient of linear thermal expansion in the temperature range of 20 to 100° C., the fictive temperature is preferably 850° C. or lower, especially preferably 800° C. or lower.

In the $TiO_2$—$SiO_2$ glass of the present invention, the $\Delta T$ is preferably 5° C. or greater. If the $\Delta T$ is smaller than 5° C., when the $TiO_2$—$SiO_2$ glass is used as an optical member of an exposure tool for EUVL, thermal expansion of the optical member during EUV light irradiation may become a problem. The temperature width is more preferably 6° C. or greater, further preferably 8° C. or greater. The temperature width, the $\Delta T$ is especially preferably 15° C. or greater, since the CTE in the temperature range of 50 to 80° C. can satisfy 0±5 ppb/° C.

In order to obtain the $TiO_2$—$SiO_2$ glass having a fictive temperature of 1,000° C. or lower, a method of keeping a $TiO_2$—$SiO_2$ glass molded article formed in a prescribed shape at a temperature of from 600 to 1,200° C. for 2 hours or more, and then decreasing the temperature to 700° C. or lower at an average temperature-decreasing rate of 5° C./hr or lower (These procedures are hereinafter referred to as "procedures (A)") is effective. In the Examples as described below, it is shown that when a $TiO_2$—$SiO_2$ glass molded article was kept at 1,100° C. for 10 hours, subsequently subjected to temperature decrease to 500° C. at a rate of 3° C./hr and then allowed to stand for natural cooling according to the foregoing method, the obtained $TiO_2$—$SiO_2$ glass (1) had a fictive temperature of 840° C. When the temperature decrease is carried out at a slower average temperature-decreasing rate, a lower fictive temperature is attained. For example, when the temperature decrease is carried out at a rate of 1° C./hr, the fictive temperature can be 800° C. or lower.

Similarly, in order to control the fluctuation of the fictive temperature to fall within 50° C., this may be attained by holding the $TiO_2$—$SiO_2$ glass form at a temperature of 600 to 1,200° C. for 2 hours or more and then performing a temperature drop to 700° C. or lower at an average temperature-decreasing rate of 10° C./hr or lower.

The fictive temperature of the $TiO_2$—$SiO_2$ glass can be measured by a known procedure. In Examples described later, the fictive temperature of the $TiO_2$—$SiO_2$ glass is measured by the following procedure.

With respect to a mirror-polished $TiO_2$—$SiO_2$ glass, an absorption spectrum is obtained by an infrared spectrometer (Magna 760, manufactured by Nikolet Company was used in the Examples as described below). In this measurement, a data-taking interval is set up at about 0.5 $cm^{-1}$, and an average value obtained by scanning 64 times is employed for the absorption spectrum. In the thus obtained infrared absorption spectrum, a peak observed in the vicinity of 2,260 $cm^{-1}$ is attributed to an overtone of stretching vibration by an Si—O—Si bond of the $TiO_2$—$SiO_2$ glass. A calibration curve is prepared from a glass of the same composition having a known fictive temperature by using this peak position, thereby determining the fictive temperature. Alternatively, a reflection spectrum of the surface is measured in the same manner by using the same infrared spectrometer. In the thus obtained infrared reflection spectrum, a peak observed in the vicinity of 1,120 $cm^{-1}$ is attributed to stretching vibration by an Si—O—Si bond of the $TiO_2$—$SiO_2$ glass. A calibration curve is prepared from a glass of the same composition having a known fictive temperature by using this peak position, thereby determining the fictive temperature. A shift of the peak position by a change in the glass composition can be extrapolated from the composition dependency of the calibration curve.

In the case of using the $TiO_2$—$SiO_2$ glass of the present invention as an optical member of an exposure tool for EUVL, from the standpoint of reducing the coefficient of linear thermal expansion, it is important to make the $TiO_2$/$SiO_2$ composition ratio in the glass uniform.

In the $TiO_2$—$SiO_2$ glass of the present invention, fluctuation of the fictive temperature is preferably within 50° C., more preferably within 30° C. If the fluctuation of the fictive temperature exceeds the foregoing range, depending on the place, there is a concern that a difference in the coefficient of linear thermal expansion is generated depending upon the site.

In the context of the present invention, the "fluctuation of the fictive temperature" is defined as a difference between the maximum value and the minimum value of the fictive temperature in an area of 30 mm×30 mm in at least one plane.

The variation of the fictive temperature can be measured as follows. A transparent $TiO_2$—$SiO_2$ glass body formed in a prescribed size is sliced to form a $TiO_2$—$SiO_2$ glass block of 50 mm×50 mm×2.0 mm. With respect to the 50 mm×50 mm plane of this $TiO_2$—$SiO_2$ glass block, by measuring a fictive temperature at intervals of a 10 mm pitch according to the foregoing method, the variation of the fictive temperature of the formed $TiO_2$—$SiO_2$ glass body is determined.

In the $TiO_2$—$SiO_2$ glass of the present invention, the OH concentration is 600 ppm or higher. In the present specification, the unit of the OH concentration, "ppm" means ppm by mass.

By the addition of OH, structural relaxation of the glass is accelerated so that it becomes easy to realize a glass structure with a low fictive temperature. Accordingly, for the purpose of lowering the fictive temperature of the $TiO_2$—$SiO_2$ glass, it is an effective measure to incorporate OH. The OH concentration of the $TiO_2$—$SiO_2$ is adjusted to 600 ppm or higher and the procedure (A) is performed, whereby a TiO$_2$—SiO$_2$ glass having a fictive temperature of 1,000° C. or lower can be obtained. If the OH concentration is lower than 600 ppm, it takes a very long time to obtain a TiO$_2$—SiO$_2$ glass having a fictive temperature of 1,000° C. or lower.

For the purpose of lowering the fictive temperature of the glass, the OH concentration is preferably 700 ppm or higher, more preferably 800 ppm or higher. In order to more effectively reduce the fictive temperature, for example, for reducing the fictive temperature without decreasing the average temperature-decreasing rate in the procedure (A), the OH concentration is preferably 900 ppm or higher, more preferably 1,000 ppm or higher.

The OH concentration of the TiO$_2$—SiO$_2$ glass can be measured by using a known method. For example, the OH concentration can be determined from an absorption peak at a wavelength of 2.7 μm through the measurement by an infrared spectrometer (see J. P. Williams, et al., *American Ceramic Society Bulletin*, 55(5), 524, 1976). The detection limit of this method is 0.1 ppm.

As the method for manufacturing an OH-containing TiO$_2$—SiO$_2$ glass, there are several processes as follows. As one example thereof, there is a manufacturing method in which a TiO$_2$—SiO$_2$ glass fine particle (soot) obtained by flame hydrolysis or thermal decomposition of a silica precursor and a titanium precursor serving as glass-forming raw materials is deposited and grown by a soot process, thereby obtaining a porous TiO$_2$—SiO$_2$ glass body; and after treating the obtained porous TiO$_2$—SiO$_2$ glass body in a water vapor-containing atmosphere, it is heated to a densification temperature or higher in a water vapor-containing atmosphere and further heated to a transparent vitrification temperature or higher, thereby obtaining an OH-containing TiO$_2$—SiO$_2$ glass. Examples of the soot process include an MCVD process, an OVD process and a VAD process depending upon the preparation manner.

The densification temperature as referred to in this specification means a temperature at which the porous glass body can be densified to such an extent that a void cannot be confirmed by an optical microscope. Also, the transparent vitrification temperature as referred to herein means a temperature at which a crystal cannot be confirmed by an optical microscope, and a transparent glass is obtained.

Another is a production method by a direct method where a silica precursor and a titania precursor working out to glass-forming raw materials are hydrolyzed and oxidized in an oxyhydrogen flame at 1,800 to 2,000° C. to obtain a TiO$_2$—SiO$_2$ glass body having incorporated thereinto OH. At this time, the OH concentration is adjusted by controlling the flame temperature or gas concentration.

In the TiO$_2$—SiO$_2$ glass of the present invention, when the fluctuation of the fictive temperature is within 50° C. and the fluctuation of the OH concentration is within 50 ppm, the thermal expansion coefficient distribution can be made to fall within 30 ppb/° C. in an area of 30 mm×30 mm in at least one plane, and the glass is suitable as an optical member of an exposure tool of EUVL.

The distribution of the coefficient of linear thermal expansion of the TiO$_2$—SiO$_2$ glass can be measured by using a known method. For example, a transparent TiO$_2$—SiO$_2$ glass formed in a prescribed size is cut and divided into TiO$_2$—SiO$_2$ glass small pieces of 15 mm×15 mm×1 mm, and the respective small pieces are measured for a coefficient of linear thermal expansion, thereby determining the variation of the coefficient of linear thermal expansion of a formed TiO$_2$—SiO$_2$ glass block.

For producing the TiO$_2$—SiO$_2$ glass of the present invention, a production method comprising the following steps (a) to (e) may be employed.

Step (a):

TiO$_2$—SiO$_2$ glass fine particles obtained through flame hydrolysis of a silica precursor and a titania precursor, each of which is a glass-forming raw material, are deposited and grown on a substrate, thereby forming a porous TiO$_2$—SiO$_2$ glass body. The glass-forming raw material is not particularly limited so far as it is a raw material capable of being gasified. Examples of the silica precursor include silicon halides such as chlorides (for example, SiCl$_4$, SiHCl$_3$, SiH$_2$Cl$_2$, SiH$_3$Cl, etc.), fluorides (for example, SiF$_4$, SiHF$_3$, SiH$_2$F$_2$, etc.), bromides (for example, SiBr$_4$, SiHBr$_3$, etc.) and iodides (for example, SiI4, etc.); and alkoxysilanes represented by R$_n$Si(OR)$_{4-n}$ (wherein R represents an alkyl group having from 1 to 4 carbon atoms; n represents an integer of from 0 to 3; and the plural R may be the same or different). Also, examples of the titanium precursor include titanium halides (for example, TiCl$_4$, TiBr$_4$, etc.); and alkoxy titaniums represented by R$_n$Ti(OR)$_{4-n}$ (wherein R represents an alkyl group having from 1 to 4 carbon atoms; n represents an integer of from 0 to 3; and the plural R may be the same or different). Also, as the silica precursor and the titanium precursor, a compound of Si and Ti such as a silicon titanium double alkoxide can be used.

A seed rod made by silica glass (for example, the seed bar described in JP-B-63-24973) can be used as the substrate. Also, the substrate to be used is not limited to a rod form but may be in plate form.

Step (b):

The porous TiO$_2$—SiO$_2$ glass body obtained in the step (a) is subjected to temperature rise to a densification temperature in a water vapor-containing atmosphere, thereby obtaining an OH-containing TiO$_2$—SiO$_2$ dense body. In the present invention, the OH content is 600 ppm or higher and the viscosity of the glass is thereby decreased. Therefore, the densification temperature is preferably 1,250 to 1,450° C., more preferably from 1,300 to 1,400° C. The water vapor-containing atmosphere is preferably an inert gas atmosphere giving a water vapor partial pressure (($p_{H2O}$) of 5,000 Pa or higher, more preferably an inert gas atmosphere giving a water vapor partial pressure (($p_{H2O}$) of 10,000 Pa or higher. The inert gas is preferably helium. In such an atmosphere, the treatment is preferably performed at a pressure of approximately from 10,000 to 200,000 Pa. The term "Pa" as referred to in this specification means an absolute pressure, not a gauge pressure.

Also, in the step (b), it is preferred to place the porous TiO$_2$—SiO$_2$ glass body under reduced pressure (preferably 13,000 Pa or lower, more preferably 1,300 Pa or lower) and then produce a water vapor-containing atmosphere by introducing an inert gas and a water vapor-containing inert gas or water vapor until the system reaches a predetermined water vapor partial pressure, because the homogeneity of the TiO$_2$—SiO$_2$ dense body increases.

Furthermore, in the step (b), it is preferred to hold the porous TiO$_2$—SiO$_2$ glass body at room temperature or a temperature not more than the densification temperature in a water vapor-containing atmosphere and then raise the temperature to the densification temperature, because the homogeneity of the TiO$_2$—SiO$_2$ dense body increases.

Step (c):

The OH-containing TiO$_2$—SiO$_2$ dense body obtained in the step (b) is subjected to temperature rise to the transparent vitrification temperature, thereby obtaining an OH-containing transparent TiO$_2$—SiO$_2$ glass body. The transparent vitrification temperature is usually from 1,350 to 1,800° C., and especially preferably from 1,400 to 1,750° C. When the OH content is 600 ppm or higher, the viscosity of the glass is lowered and the transparent vitrification temperature is lowered. Accordingly, the temperature is preferably from 1,350 to 1,750° C., and especially preferably from 1,400 to 1,700° C.

As the atmosphere, an atmosphere of 100% of an inert gas, such as helium or argon, or an atmosphere containing, as a major component, an inert gas, such as helium or argon, is preferred. The pressure may be a reduced pressure or normal pressure. In the case of a reduced pressure, the pressure is preferably not higher than 13,000 Pa.

Step (d):

The OH-containing transparent $TiO_2$—$SiO_2$ glass body obtained in the step (c) is heated to a temperature of the softening point or higher and formed in a desired shape, thereby obtaining an OH-containing formed $TiO_2$—$SiO_2$ glass body. The forming temperature is preferably from 1,500 to 1,800° C. When the forming temperature is lower than 1,500° C., since the viscosity of the OH-containing transparent $TiO_2$—$SiO_2$ glass body is high, deformation due to own weight does not substantially proceed. Also, the growth of cristobalite which is a crystal phase of $SiO_2$ or the growth of rutile or anatase which is a crystal phase of $TiO_2$ may possibly occur, thereby causing so-called devitrification. When the forming temperature exceeds 1,800° C., there is a possibility that sublimation of $SiO_2$ cannot be neglected.

Incidentally, the step (c) and the step (d) may be performed continuously or simultaneously.

Step (e):

The formed $TiO_2$—$SiO_2$ glass body obtained in the step (d) is kept at a temperature of from 600 to 1,200° C. for one hour or more and then subjected to an annealing treatment of decreasing the temperature to 500° C. or lower at an average temperature-decreasing rate of 10° C./hr or lower, thereby controlling the fictive temperature of the $TiO_2$—$SiO_2$ glass. Alternatively, the formed $TiO_2$—$SiO_2$ glass body which is obtained in the step (d) and is at 1,200° C. or higher is subjected to an annealing treatment of decreasing the temperature to not higher than 500° C. at an average temperature-decreasing rate of 60° C./hr or lower, thereby controlling the fictive temperature of the $TiO_2$—$SiO_2$ glass. After decreasing the temperature to 500° C. or lower, natural cooling can be applicable. In that case, the atmosphere is preferably an atmosphere of 100% of an inert gas, such as helium, argon or nitrogen, an atmosphere containing, as a major component, such an inert gas, or an air atmosphere; and the pressure is preferably a reduced pressure or normal pressure.

For achieving a lower fictive temperature, it is effective to cool the glass body at a lower cooling rate in the temperature region near the gradual cooling point or strain point of glass. Specifically, in the cooling profile of the step (e), the lowest cooling rate is preferably 10° C./hr or lower, more preferably 5° C./hr or lower, especially preferably 2° C./hr or lower.

The $TiO_2$—$SiO_2$ glass of the present invention is preferably free of an inclusion of 50 μm or more. It is preferred to be free of an inclusion of 10 μm or more, more preferably be free of an inclusion of 1 μm or more, especially preferably be free of an inclusion of 100 nm or more. The inclusion indicates a foreign matter, a bubble or the like present in the glass. The foreign matter may be produced due to contamination or crystal deposition in the production process of glass. For eliminating an inclusion such as foreign matter or bubble, it is necessary to suppress contamination generated in the production process, particularly in the step (a), and further exactly control the temperature conditions in the steps (b) to (d).

EXAMPLES

The present invention will be illustrated in greater detail below with reference to the following Examples, but the present invention should not be construed as being limited thereto. Incidentally, Examples 1 to 6 are Examples of the present invention and the others are Comparative Examples.

Example 1

$TiO_2$—$SiO_2$ glass fine particles obtained by gasifying each of $TiCl_4$ and $SiCl_a$ which are glass-forming materials for a $TiO_2$—$SiO_2$ glass, mixing these gases and subjecting the mixed gas to heat hydrolysis (flame hydrolysis) in oxyhydrogen flame is deposited and grown on a substrate to form a porous $TiO_2$—$SiO_2$ glass body (step (a)).

The obtained porous $TiO_2$—$SiO_2$ glass body is difficult to handle without any treatment and therefore, this porous glass body is kept in air at 1,200° C. for 6 hours together with the substrate and then separated from the substrate.

The porous $TiO_2$—$SiO_2$ glass body is set in an electric furnace capable of controlling the atmosphere. After reducing the pressure to 1,300 Pa at room temperature, water is charged into a glass-made bubbler, bubbling is performed with an He gas under a normal pressure at 80° C., and while introducing water vapor together with an He gas into the furnace, the glass body is kept in this atmosphere at 1,000° C. under normal pressure for 4 hours to effect doping with OH.

Thereafter, the temperature is raised to 1,450° C. in the same atmosphere, and the glass body is kept at this temperature for 4 hours to obtain an OH-containing $TiO_2$—$SiO_2$ dense body (step (b)).

The obtained OH-containing $TiO_2$—$SiO_2$ dense body is heated to 1,700° C. in an argon atmosphere by using a carbon furnace to obtain an OH-containing transparent $TiO_2$—$SiO_2$ glass body (step (c)).

The obtained OH-containing transparent $TiO_2$—$SiO_2$ glass body is heated to a temperature not lower than the softening point (1,750° C.) and formed into a desired shape to obtain an OH-containing formed $TiO_2$—$SiO_2$ glass body (step (d)).

The obtained glass is kept at 1,100° C. for 10 hours and then subject to temperature decrease to 500° C. at a rate of 3° C./hr, followed by allowing it to stand for natural cooling (step (e)).

Example 2

A $TiO_2$—$SiO_2$ glass body is obtained in the same manner as in Example 1 except that in the step (a) of Example 1, the amount of $TiCl_4$ supplied is slightly increased.

Example 3

$TiO_2$—$SiO_2$ glass fine particles obtained by gasifying each of $TiCl_4$ and $SiCl_4$ which are glass-forming materials for a $TiO_2$—$SiO_2$ glass, mixing these gases and subjecting the mixed gas to heat hydrolysis (flame hydrolysis) in oxyhydrogen flame is deposited and grown on a substrate to form a porous $TiO_2$—$SiO_2$ glass body (step (a)).

The obtained porous $TiO_2$—$SiO_2$ glass body is difficult to handle without any treatment and therefore, this porous glass body is kept in air at 1,200° C. for 6 hours together with the substrate and then separated from the substrate.

The porous $TiO_2$—$SiO_2$ glass body is set in an electric furnace capable of controlling the atmosphere. After reducing the pressure to 1,300 Pa at room temperature, water is charged into a glass-made bubbler, bubbling is performed with an He gas under a normal pressure at 100° C., and while introducing water vapor together with an He gas into the furnace, the glass body is kept in this atmosphere at 1,000° C. under normal pressure for 4 hours to effect doping with OH.

Thereafter, the temperature is raised to 1,450° C. in the same atmosphere, and the glass body is kept at this temperature for 4 hours to obtain an OH-containing $TiO_2$—$SiO_2$ dense body (step (b)).

The obtained OH-containing $TiO_2$—$SiO_2$ dense body is heated to 1,700° C. in an argon atmosphere by using a carbon furnace to obtain an OH-containing transparent $TiO_2$—$SiO_2$ glass body (step (c)).

The obtained OH-containing transparent $TiO_2$—$SiO_2$ glass body is heated to a temperature not lower than the softening point (1,750° C.) and formed into a desired shape to obtain an OH-containing formed $TiO_2$—$SiO_2$ glass body (step (d)).

The obtained glass is kept at 1,100° C. for 10 hours and then subject to a temperature decrease to 500° C. at a rate of 3° C./hr, followed by allowing it to stand for natural cooling (step (e)).

Example 4

$TiO_2$—$SiO_2$ glass fine particles obtained by gasifying each of $TiCl_4$ and $SiCl_4$ which are glass-forming materials for a $TiO_2$—$SiO_2$ glass, mixing these gases and subjecting the mixed gas to heat hydrolysis (flame hydrolysis) in oxyhydrogen flame is deposited and grown on a substrate to form a porous $TiO_2$—$SiO_2$ glass body (step (a)).

The obtained porous $TiO_2$—$SiO_2$ glass body is difficult to handle without any treatment and therefore, this porous glass body is kept in air at 1,200° C. for 6 hours together with the substrate and then separated from the substrate.

The porous $TiO_2$—$SiO_2$ glass body is set in an electric furnace capable of controlling the atmosphere. After reducing the pressure to 1,300 Pa at room temperature, water is charged into a glass-made bubbler, bubbling is performed with an He gas under a normal pressure at 100° C., and while introducing water vapor together with an He gas into the furnace, the glass body is kept in this atmosphere at 1,000° C. under normal pressure for 4 hours to effect doping with OH.

Thereafter, the temperature is raised to 1,450° C. in the same atmosphere, and the glass body is kept at this temperature for 4 hours to obtain an OH-containing $TiO_2$—$SiO_2$ dense body (step (b)).

The obtained OH-containing $TiO_2$—$SiO_2$ dense body is heated to 1,700° C. in an argon atmosphere by using a carbon furnace to obtain an OH-containing transparent $TiO_2$—$SiO_2$ glass body (step (c)).

The obtained OH-containing transparent $TiO_2$—$SiO_2$ glass body is heated to a temperature not lower than the softening point (1,750° C.) and formed into a desired shape to obtain an OH-containing formed $TiO_2$—$SiO_2$ glass body (step (d)).

The obtained glass is kept at 1,100° C. for 10 hours, subjected to temperature decrease to 900° C. at a rate of 10° C./hr, then temperature decrease to 700° C. at a rate of 1° C./hr and further temperature decrease to 500° C. at a rate of 10° C./hr, followed by allowing it to stand for natural cooling (step (e)).

Example 5

A $TiO_2$—$SiO_2$ glass body is obtained in the same manner as in Example 4 except that in the step (a) of Example 4, the amount of $TiCl_4$ supplied is slightly increased.

Example 6

$TiO_2$—$SiO_2$ glass fine particles obtained by gasifying each of $TiCl_4$ and $SiCl_4$ which are glass-forming materials for a $TiO_2$—$SiO_2$ glass, mixing these gases and subjecting the mixed gas to heat hydrolysis (flame hydrolysis) in oxyhydrogen flame is deposited and grown on a substrate to form a porous $TiO_2$—$SiO_2$ glass body (step (a)).

The obtained porous $TiO_2$—$SiO_2$ glass body is difficult to handle without any treatment and therefore, this porous glass body is kept in air at 1,200° C. for 6 hours together with the substrate and then separated from the substrate.

The porous $TiO_2$—$SiO_2$ glass body is set in an electric furnace capable of controlling the atmosphere. After reducing the pressure to 1,300 Pa at room temperature, water is charged into a glass-made bubbler, bubbling is performed with an He gas under a normal pressure at 90° C., and while introducing water vapor together with an He gas into the furnace, the glass body is kept in this atmosphere at 1,000° C. under normal pressure for 4 hours to effect doping with OH.

Thereafter, the temperature is raised to 1,450° C. in the same atmosphere, and the glass body is kept at this temperature for 4 hours to obtain an OH-containing $TiO_2$—$SiO_2$ dense body (step (b)).

The obtained OH-containing $TiO_2$—$SiO_2$ dense body is heated to 1,700° C. in an argon atmosphere by using a carbon furnace to obtain an OH-containing transparent $TiO_2$—$SiO_2$ glass body (step (c)).

The obtained OH-containing transparent $TiO_2$—$SiO_2$ glass body is heated to a temperature not lower than the softening point (1,750° C.) and formed into a desired shape to obtain an OH-containing formed $TiO_2$—$SiO_2$ glass body (step (d)).

The obtained glass is kept at 1,100° C. for 10 hours and then subject to temperature decrease to 500° C. at a rate of 5° C./hr, followed by allowing it to stand for natural cooling (step (e)).

Example 7

$TiO_2$—$SiO_2$ glass fine particles obtained by gasifying each of $TiCl_4$ and $SiCl_4$ which are glass-forming materials for a $TiO_2$—$SiO_2$ glass, mixing these gases and subjecting the mixed gas to heat hydrolysis (flame hydrolysis) in oxyhydrogen flame is deposited and grown on a substrate to form a porous $TiO_2$—$SiO_2$ glass body (step (a)).

The obtained porous $TiO_2$—$SiO_2$ glass body is difficult to handle without any treatment and therefore, this porous glass body is kept in air at 1,200° C. for 4 hours together with the substrate and then separated from the substrate.

The porous $TiO_2$—$SiO_2$ glass body is set in an electric furnace capable of controlling the atmosphere and after reducing the pressure to 1,300 Pa at room temperature and then raising the temperature to 1,450° C. in a 100% He atmosphere, the glass body is kept at this temperature for 4 hours to obtain a $TiO_2$—$SiO_2$ dense body (step (b)).

The obtained $TiO_2$—$SiO_2$ dense body is heated to 1,750° C. in an argon atmosphere by using a carbon furnace to obtain a transparent $TiO_2$—$SiO_2$ glass body (step (c)).

The obtained transparent $TiO_2$—$SiO_2$ glass body is heated to a temperature not lower than the softening point (1,750° C.) and formed into a desired shape to obtain a formed $TiO_2$—$SiO_2$ glass body (step (d)).

The obtained glass is kept at 1,100° C. for 10 hours and subject to a temperature decrease to 500° C. at a rate of 150° C./hr, followed by allowing it to stand for natural cooling (step (e)).

Example 8

ULE #7972 produced by Corning, which is known as a zero-expansion $TiO_2$—$SiO_2$ glass, is used.

Each of glasses prepared in Examples 1 to 8 is measured for physical properties and the results are shown together in Table 1. As for the evaluation method, each is evaluated according to the measuring method described above. In Table 1, the COT is calculated by determining the temperature at which the coefficient of linear thermal expansion becomes 0 ppb/° C., from the curve of FIG. 1. Also, in Table 1, the ΔT is calculated by determining the temperature range where the coefficient of linear thermal expansion becomes from −5 to 5 ppb/° C., from the curve of FIG. 1.

TABLE 1

|  | TiO$_2$ Concentration [%] | OH Concentration [ppm] | Fictive Temperature [° C.] | COT [° C.] | ΔT [° C.] | Average Coefficient of Linear Thermal Expansion in the temperature range of 20 to 100° C [ppb/° C.] |
|---|---|---|---|---|---|---|
| Example 1 | 8.3 | 730 | 840 | 58 | 17 | 3.7 |
| Example 2 | 8.5 | 730 | 840 | 71 | 30 | 10 |
| Example 3 | 8.4 | 1030 | 830 | 72 | 18 | −12 |
| Example 4 | 8.9 | 1030 | 790 | 52 | 8.8 | 0.7 |
| Example 5 | 9.1 | 1030 | 790 | 76 | 21 | 19 |
| Example 6 | 7.8 | 860 | 880 | 42 | 5.1 | 22 |
| Example 7 | 6.7 | 30 | 1070 | 24 | 4.7 | 103 |
| Example 8 | 7.2 | 880 | 900 | −2.4 | 4.1 | 61 |

In the glasses of Examples 1 to 6, the fluctuation of the fictive temperature is within 50° C., and the fluctuation of the OH concentration is within 50 ppm.

As apparent from Table 1, in Examples 1 to 6 where the COT falls within the range of from 40 to 110° C. and the average coefficient of linear thermal expansion in the temperature range of 20 to 100° C. is 50 ppb/° C. or lower, the coefficient of linear thermal expansion when irradiating high EUV energy light becomes substantially zero, and CTE stably becomes almost zero in a wide temperature range, revealing that the silica glass is suitable as an optical member of an exposure tool for EUVL.

While the invention has been described in detail and with reference to specific embodiments thereof, it will be apparent to one skill in the art that various changes and modifications can be made therein without departing from the sprit and scope thereof.

This application is based on Japanese patent application No. 2008-043583 filed on Feb. 25, 2008, the entire contents of which are incorporated hereinto by reference. All references cited herein are incorporated in their entirety.

INDUSTRIAL APPLICABILITY

The silica glass and optical part of the present invention are suitable for use in an exposure tool for EUV lithography.

The invention claimed is:

1. A TiO$_2$-containing silica glass, having a fictive temperature of 1,000° C. or lower, a OH concentration of 600 ppm or higher, a temperature at which the coefficient of linear thermal expansion becomes 0 ppb/° C., falling within a range of from 40 to 110° C., and an average coefficient of linear thermal expansion in a temperature range of 20 to 100° C., of 50 ppb/° C. or lower.

2. The TiO$_2$-containing silica glass according to claim 1, wherein a TiO$_2$ content is from 7.5 to 12% by mass.

3. The TiO$_2$-containing silica glass according to claim 1, wherein a temperature width, in which a coefficient of linear thermal expansion becomes 0±5 ppb/° C., is 5° C. or greater.

4. The TiO$_2$-containing silica glass according to claim 1, wherein an average coefficient of linear thermal expansion in the temperature range of 20 to 100° C., is −120 ppb/° C. or higher.

5. The TiO$_2$-containing silica glass according to claim 1, which is free of an inclusion.

6. The TiO$_2$-containing silica glass according to claim 1, wherein a fluctuation of the fictive temperature is within 50° C.

7. An optical member for EUV lithography, comprising the TiO$_2$-containing silica glass according to claim 1.

8. The TiO$_2$-containing silica glass according to claim 1, wherein the temperature width, in which a coefficient of linear thermal expansion becomes 0±5 ppb/° C., is 8° C. or greater.

9. The TiO$_2$-containing silica glass according to claim 1, wherein the TiO$_2$ content is from 8.0 to 12% by mass.

10. The TiO$_2$-containing silica glass according to claim 1, wherein the fictive temperature is 900° C. or lower.

\* \* \* \* \*